US012589870B2

(12) United States Patent
Zakrzewski

(10) Patent No.: US 12,589,870 B2
(45) Date of Patent: Mar. 31, 2026

(54) METHOD OF OBTAINING LIFT AND THRUST FOR HORIZONTAL FLIGHT OF VERTICAL TAKE-OFF AND LANDING FLYING MACHINE WHILE MAINTAINING THE HORIZONTAL STABILITY OF THE MACHINE'S FLIGHT AND THE MACHINE TO IMPLEMENT THIS METHOD

(71) Applicants:Tymoteusz Bitland Olszewski, Toruń (PL); Tomasz Zakrzewski, Chełmźa (PL)

(72) Inventor: Tomasz Zakrzewski, Chełmźa (PL)

(73) Assignees: Tymoteusz Bitland Olszewski, Toruń (PL); Tomasz Zakrzewski, Chełmza (PL)

( * ) Notice: Subject to any disclaimer, the term of this patent is extended or adjusted under 35 U.S.C. 154(b) by 0 days.

(21) Appl. No.: 18/698,410

(22) PCT Filed: Oct. 4, 2022

(86) PCT No.: PCT/PL2022/000058
§ 371 (c)(1),
(2) Date: Apr. 4, 2024

(87) PCT Pub. No.: WO2023/059209
PCT Pub. Date: Apr. 13, 2023

(65) Prior Publication Data
US 2024/0425178 A1     Dec. 26, 2024

(30) Foreign Application Priority Data
Oct. 4, 2021     (PL) ......................................... 439127

(51) Int. Cl.
*B64C 29/02*     (2006.01)
*B64C 39/00*     (2023.01)

(52) U.S. Cl.
CPC ............ *B64C 29/02* (2013.01); *B64C 39/001* (2013.01)

(58) Field of Classification Search
CPC .............................. B64C 39/001; B64C 29/02
See application file for complete search history.

(56) References Cited

U.S. PATENT DOCUMENTS 3,465,989 A * 9/1969 Bowshier .............. B64C 39/001
                                          244/23 C
3,774,865 A * 11/1973 Pinto .................... B64C 39/001
                                          244/23 C
(Continued)

FOREIGN PATENT DOCUMENTS

AU        2022359219        5/2024
CA        3233959           4/2024
(Continued)

OTHER PUBLICATIONS

International Search Report and the Written Opinion Dated Jan. 25, 2023 From the International Searching Authority Re. Application No. PCT/PL2022/000058. (12 Pages).
(Continued)

*Primary Examiner* — Nicholas McFall

(57) ABSTRACT

The method of obtaining both, lifting force and thrust, required for horizontal flight of the vertical take-off and landing flying machine while maintaining horizontal flight stability of the machine which is realized due to suction atmospheric air to the inner cavity formed between coaxial mounted, multi-blade turbines (2, 18), the top and the bottom, which are counter-rotating relatively to each other, and remove the air outside under the machine; the conical turbines are mounted with the direction of wider, circular bases facing in front of them and which are mounted on the double-sided fixed bearings (4, 16) alongside the contour edge of the external ring (12), which is mounted using the
(Continued)

distance spacers (13) form the inner side to the central housing (6) which is formed with the conical shape and which is the base where the both turbines (2, 18) are mounted using linear drives from the side of their smaller bases. The air which is accumulated under the pressure at such inner cavity is removed outside of the external ring (12) using drive nozzles (15A, 15B, 15C, 15D), which are installed circumferentially at the inner ring, to achieve thrust required for the horizontal flight or stabilization nozzles (14A, 14B), which are used to maintain required rotational stabilization of the central ring (6). The subject of the invention is also the machine used to achieve this way.

8 Claims, 6 Drawing Sheets

(56)                    References Cited

U.S. PATENT DOCUMENTS

| 10,676,182 | B2 | 6/2020 | Lauder |
| 2017/0166315 | A1 | 6/2017 | Noroian |

FOREIGN PATENT DOCUMENTS

| CN | 108706103 | 10/2018 |
| CN | 118201847 | 6/2024 |
| EP | 1502852 | 2/2005 |
| EP | 3760540 | 1/2021 |
| EP | 4412902 | 8/2024 |
| IL | 311958 | 6/2024 |
| JP | 2024-536455 | 10/2024 |
| PL | 439127 | 10/2022 |
| PL | 243857 | 10/2023 |
| WO | WO 2004/065208 | 8/2004 |

OTHER PUBLICATIONS

Sprawozdanie o Stanie Techniki Zgtoszenia [Report of State of Notification Technology] Dated Jun. 15, 2022 From the Urzad Patentowy Rzeczypospolitej Polskiej [Patent Office of the Republic of Poland] Re. Application No. 439127. (1 Page).

* cited by examiner

1

METHOD OF OBTAINING LIFT AND THRUST FOR HORIZONTAL FLIGHT OF VERTICAL TAKE-OFF AND LANDING FLYING MACHINE WHILE MAINTAINING THE HORIZONTAL STABILITY OF THE MACHINE'S FLIGHT AND THE MACHINE TO IMPLEMENT THIS METHOD

RELATED APPLICATIONS

This application is a National Phase of PCT Patent Application No. PCT/PL2022/000058 having International filing date of Oct. 4, 2022, which claims the benefit of priority of Poland Patent Application No. P.439127 filed on Oct. 4, 2021. The contents of the above applications are all incorporated by reference as if fully set forth herein in their entirety.

FIELD AND BACKGROUND OF THE INVENTION

The subject of the invention is the method of obtaining lift and thrust for horizontal flight of a vertical take-off and landing of the flying machine while maintaining the horizontal stability of the machine's flight and a machine for the implementation of this method, applicable in aviation to transport people, goods, to carry out local inspections, patrol the area, filming, scanning, or in search and rescue operations.

From the Chinese application for utility model CN107140205A there is known a vertical take-off and landing aircraft of the disc type, which consists of a body, two fans and four air doors, in which the cross-section of the body has an oval structure, and the two ends of the small axis of the body extend and form external projections. A recess is formed in the body, two fans are placed in series at the top of the recess, and four air doors are placed on the lower wall of the recess. According to the invention, fans and air doors are mounted in the recesses of the body, which prevents the exposure of the blades of high-speed fans.

From the Polish documentation of the notification P.311837 is known the flying ship of vertical rise and fall. A motor is built into the body that drives the compressor. Under the compressor there is a compressed air chamber. Compressed air flows through channels to the outlet nozzles located around the perimeter of the body. Flowing out at the right speed, the air from the exhaust nozzles flows around the upper surface of the body. This air, at the edge forming the inlet to the compressor, is again sucked in by the compressor. Air flowing at the right speed, the upper surface of the body reduces static pressure directly above the surface of the body. The pressure difference under the body and above the body gives lift to the flying craft.

The European notification dossier EP1384662A1 reveals a micro VTOL aircraft consisting of a first and second channel rotor aligned with each other and distant from the common axis, whose propellers are rotary driven in opposite directions. Between the two channel rotors, the fuselage and wing arrangement formed by wing profiles forming the X or H configuration and equipped with control flaps are placed.

European notification dossier EP1396423A1 is known to include a VTOL aircraft containing the first and second channel rotors located at the ends of the vertical fuselage and whose propellers are propelled to rotate in opposite directions. The control flaps for orientation and transverse flight shall be actively connected at least to the lower channel rotor.

From the documentation of the Polish notification P.350150 is known an air-flying disc similar to a sports disk, which is built from a cabin to which two turbines are mounted on the bearings, the upper and lower, having from the inside under the fixed structure of the turbine along the supporting lobes titanium discs, on which the gas streams of jet engines act, driving the upper turbine to the right and the lower to the left. The cabin stands still and does not rotate during turbine rotation, and the centrifugal force of the turbines during rotation makes the supporting airfoils rise up to 30°, and at higher revolutions the turbines raise the entire vehicle-disk up to the desired height with incredible ease. The pressure of gases and air, the operation of turbines stabilize horizontally and gravitationally the vehicle-disk, and also favorably reduce the gravitational pull of the Earth. Then the gas streams are translated to the outside of the turbines. The horizontal flight of the disc and the air flow pressure closes the vehicle tightly, automatically lifts the tiller outside and the disc vehicle obtains the control efficiency of the jet aircraft. The landing route is reversed. We brake with the engines, and when the vehicle begins to fall, we put the gas streams back on the turbine discs and land anywhere. The vehicle has a platform, filled with 4/5 polystyrene foam chambers, which allows landing on the water. In addition, the turbine cabin, control room and platform are made of titanium sheet.

From the documentation of the U.S. notification U.S. Pat. No. 3,584,810A is known a VTOL aircraft containing an airframe, upper and lower rotor lifting elements mounted on the said airframe, adapted to rotate in opposite directions in essentially parallel planes with substantially equal speeds, substantially equal upper and lower ring guards arranged along a common axis on the airframe attached to the mentioned frame, the upper rotor lifting element can rotate in the said upper cover, the mentioned lower rotor lifting element rotates in the said lower cover, the cover of the pilot mounted on the airframe between the upper and lower rotor lifting elements essentially on the axle, the motor centres for rotating each of the rotor lift elements, the motor means located in the space between the said upper and lower guards and having upper and lower output powers, extending to the space surrounded by the upper and lower guards and distant from the axle, the means of propulsion operationally connection of the said upper and lower power outputs to the said upper and lower rotors lifting the rotor components, and the control means acting to selectively change the sequence of the said rotor lift elements relative to each other.

From the U.S. notification documentation U.S. Pat. No. 4,214,720A, a flying disk capable of vertical take-off, hovering or horizontal flight with propulsion is known. The dial contains a disc wing, which is round and has a convex surface on the upper side and a concave lower surface. The sash also contains an inner guide edge that marks a circular hole centered on the vertical central axis. Arched surfaces converge on the leading edge and on the outer concentric trailing edge. The discoidal wing can be freely rotated on a central supporting structure that also supports the cockpit. Two sets of turbine blades are attached to the disc wing in the vicinity of the leading edge. Thrust generating motors are mounted to a central supporting structure to direct the thrust radially outwards through the turbine blades. This causes the disc wing to rotate and causes it to rise. The thrust angle can be adjusted so that the thrust is directed only to one or the other set of to change the load-bearing characteristics. Around the upper surface of the disc in the vicinity of the cockpit there is a set of compressor blades. The compressor blades rotate along with the discoidal wing, receiving and directing air down to the central supporting structure. They supply combustion air to the engine and reduce the air pressure above the disc. Horizontal thrust motors are located below the concave surface of the wing to ensure horizontal thrust. Control and rotational stabilization of the cockpit and the central supporting structure is provided by the thrust change mechanism.

SUMMARY OF THE INVENTION

Vertical launch flying machines are available in manned versions—helicopters and unmanned—drones. Both types of machines and VTOL designs use the rotational work of many propeller rotors, thanks to which they obtain lifting force for flight and stability.

Kamow helicopters are known, in which a coaxial counter-rotating arrangement of carrier rotors is used. This configuration does not require the use of a tail rotor, since torque compensation is provided by a second, counter-rotating rotor. This allows, m.in, to build compact machines, with smaller dimensions than comparable machines in the classic system, eliminates power losses caused by the need to transmit its parts to the tail propeller. Its absence also removes the threat to ground personnel arising in conventional constructions.

Horizontal flight of known machines occurs as a result of an imbalance in the horizontal equilibrium of the rotor or rotors of the machine and the deflection of the thrust vector in the opposite direction to the direction of flight. In the latest models of helicopters, separate propeller drives are responsible for the horizontal thrust vector. These machines are powered by various types of internal combustion engines-piston, turbine in single or multi-engine systems and electric motors in the case of drones. The latest family of this type of ships are EVTOL (Electric Vertical TakeOff and Landing) machines. These are multi-rotor machines with electric propulsion, which are a hybrid of a helicopter with a drone and in some projects with an aircraft, in a manual or autonomous control system.

The aim of the invention is to develop a vertical take-off and landing machine with electric drive, in which the horizontal direction of flight is obtained without the need for the machine to lean out, i.e. while maintaining horizontal stability during all phases of flight.

A method of obtaining lift and thrust for horizontal flight of a vertical take-off and landing flying machine while maintaining the horizontal stability of the machine's flight by sucking atmospheric air into the space created between the coaxial-seated multi-blade turbines, upper and lower, rotating counter-rotating and discharging it outwards under the machine is characterized by the fact that tapered turbines are deposited with wider bases directed towards each other, on bearings fixed on both sides along the edges of the outer ring, which is attached at distances from the inside to the central body in the shape of a truncated cone, on which both turbines are fixed via linear motors from the side of their smaller bases. The air accumulated under pressure in the air compression space thus created is ejected outside the outer ring through the drive nozzles built into it around the perimeter in order to obtain the desired thrust for horizontal flight or stabilization nozzles to obtain rotational stabilization of the central body.

Electric vertical take-off and landing flying machine equipped with communication, navigation and control systems, including a central body, to which two multi-blade turbines are mounted coaxially on the bearing, the upper and lower ones, which, after starting the machine, rotate in opposite directions, are characterized, according to the invention, by the fact that the central body has the shape of a truncated cone and in the upper part has a circumferentially fixed linear motor of the upper turbine drive and in the lower part it has a circumferentially fixed linear motor of the drive of the lower turbine. Between the linear motors, rigid, horizontal beams are attached, to which the outer ring is attached. The top turbine and the lower turbine are tapered support turbines that face larger bases towards each other and are mounted on magnetic bearings fixed circumferentially on both sides along the edge of the outer ring. The outer ring shall have at least two stabilising nozzles opposite, between which there are at least four drive nozzles. The area of the blades of the upper turbine is greater than the area of the blades of the lower turbine.

Preferably, the electronic modules of the communication, navigation and control systems are located in the upper part of the central body, and inside the central body a battery compartment is located adjacent to its wall, and its interior is a loading space.

Preferably, the machine has a three-legged chassis and a loading ramp.

Preferably, stabilizing nozzles and drive nozzles are equipped with flaps with a drive implemented by stepper motors.

According to the invention, the machine is characterized by total horizontal stability of the device in each phase of flight. After starting the take-off procedure and obtaining the proper rotation of the turbine disks, the gyroscopic stabilization of the device in the horizontal plane occurs and is unchanged during all phases of flight (take-off, ascent, horizontal flight, lowering the ceiling, landing). The control of aircraft and drones relies on the specialized training and experience of operators and pilots and, to a large extent, on the sense of maneuvers performed, because these maneuvers consist in putting drones into a state of imbalance in order to obtain any maneuver in the air. Thanks to the stability that the invention provides, we achieve simplification of control, i.e. the ability to control the device by untrained people without experience in controlling aircraft and drones. In the case of well-known VTOL machines, all maneuvers are very complicated and special training of pilots is needed or they require complex software for autonomous flights, while the invention solves this problem, since maneuvering is simple and does not require specialized training. The operation of conical turbines does not threaten outsiders near the device. None of the elements threatens people staying near the taking off or landing machine according to the invention, there are no moving propellers, during operation invisible to outsiders, which is a huge threat and construction problem of VTOL machines.

The shape used saves energy and is the most aerodynamically optimal shape in aviation. In well-known drones, the failure of one engine causes the danger of disaster, while the system of two carrier turbines is a simplified system, which makes it less susceptible to failures, which increases the safety of VTOL aircraft flights. The simplified control system does not require the use of computers with complex software to perform difficult maneuvers, a simple emergency landing system of a rotating car gives the opportunity to perform fully autonomous VTOL flights. Thanks to the shape of the disk, the influence of air currents on flight stability is minimized. Positioning the body of the ship automatically according to geographical poles, simplifies the determination of the direction of flight without the possibility of mistake and flight in the wrong direction, allows you to apply a simple and accurate flight control system.

BRIEF DESCRIPTION OF THE SEVERAL VIEWS OF THE DRAWINGS

The invention is further explained in the embodiment in the drawing where.

DESCRIPTION OF SPECIFIC EMBODIMENTS OF THE INVENTION

Example I

Figure 1:
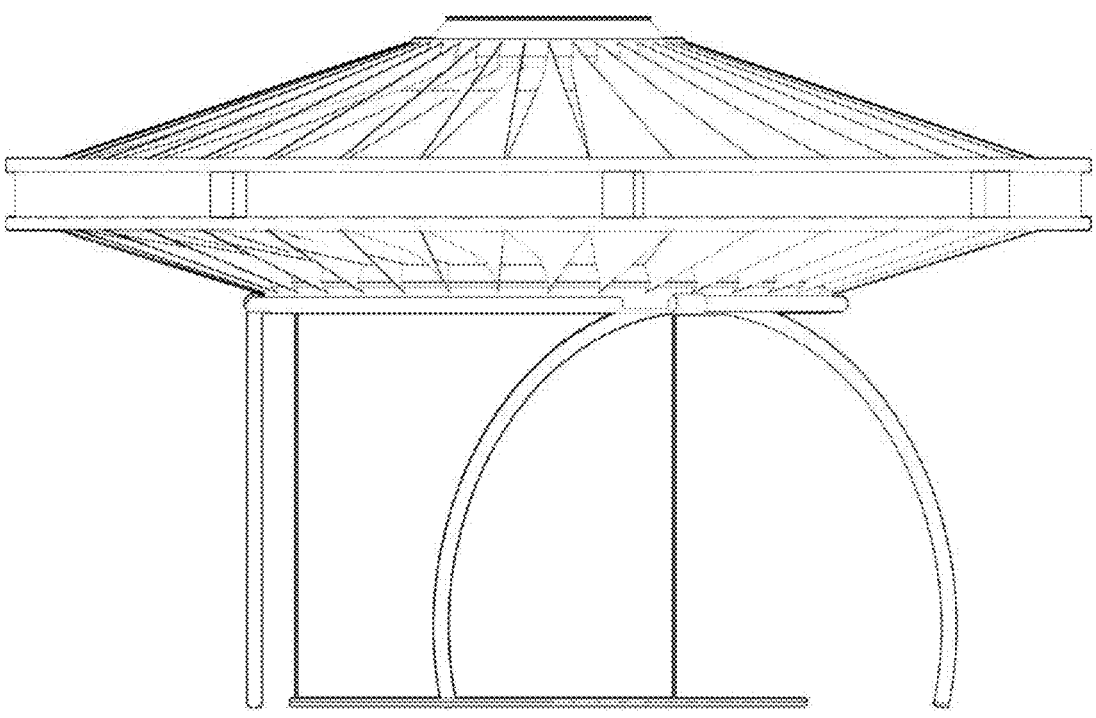
FIG. 1 schematically shows a machine with a visible three-legged chassis and a lowered loading ramp in the side view, FIG. 2 schematically represents the machine in a longitudinal section, FIG. 3 schematically shows the components of the upper part of the machine in unfolding, FIG. 4 schematically shows the components of the central part of the machine in unfolding, FIG. 5 schematically shows the components of the central part of the machine in unfolding, FIG. 6 schematically shows the components of the lower part of the machine in unfolding, FIG. 7 schematically shows the horizontal cross-section at the height of the center of the outer ring with the ejection of compressed air masses in the space between the discs by the drive nozzles and by the stabilizing nozzles, FIG. 8 schematically shows the drive nozzle.
Figure 2:
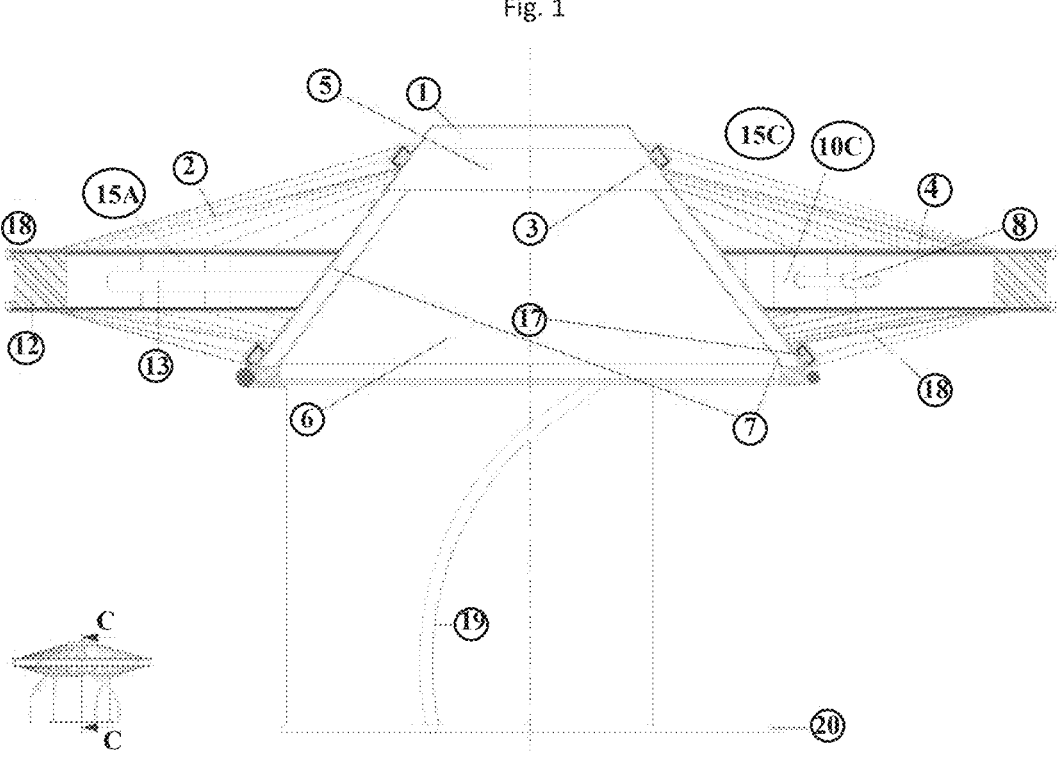
Figures 3, 4:
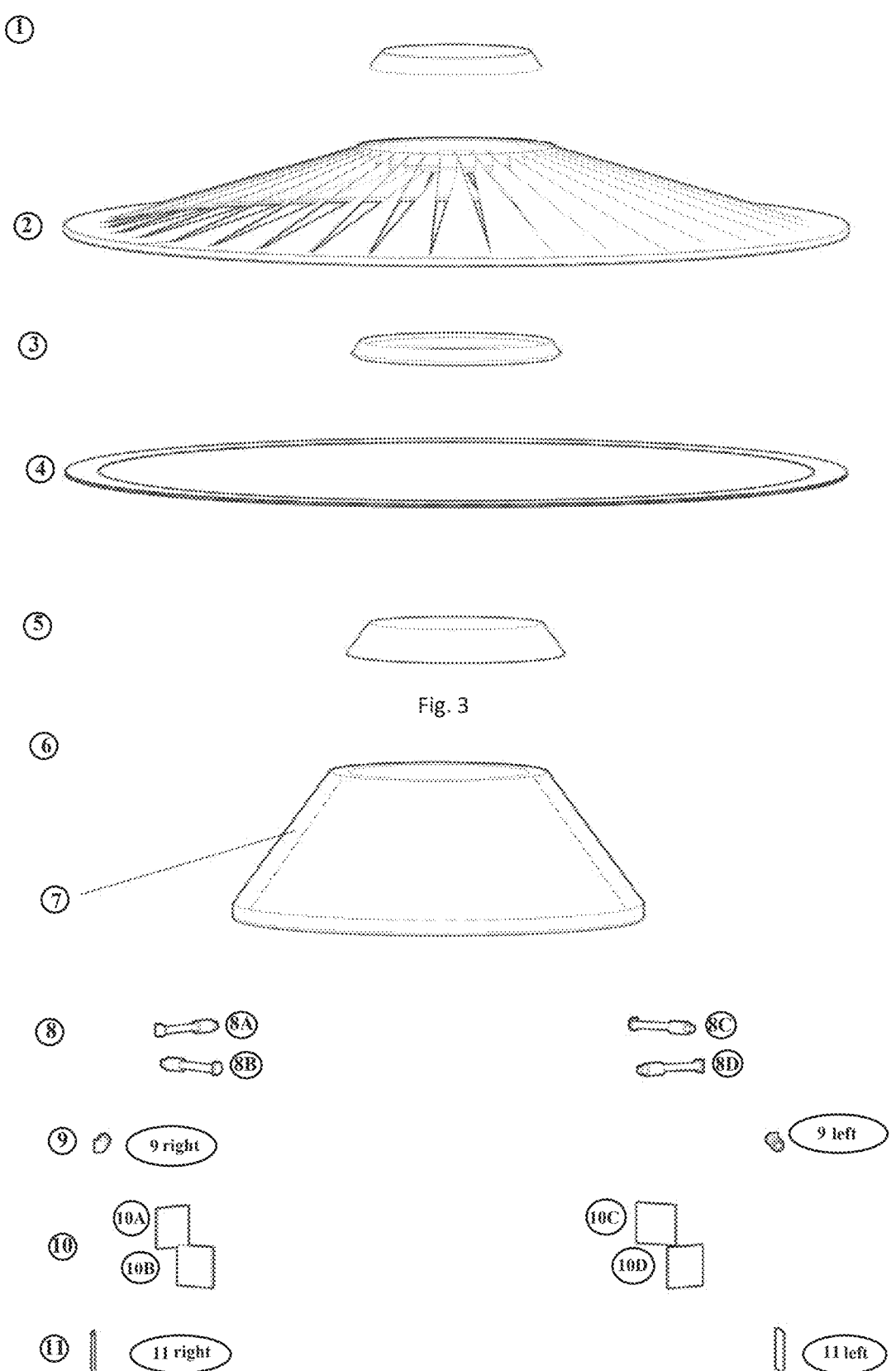
Figure 5:
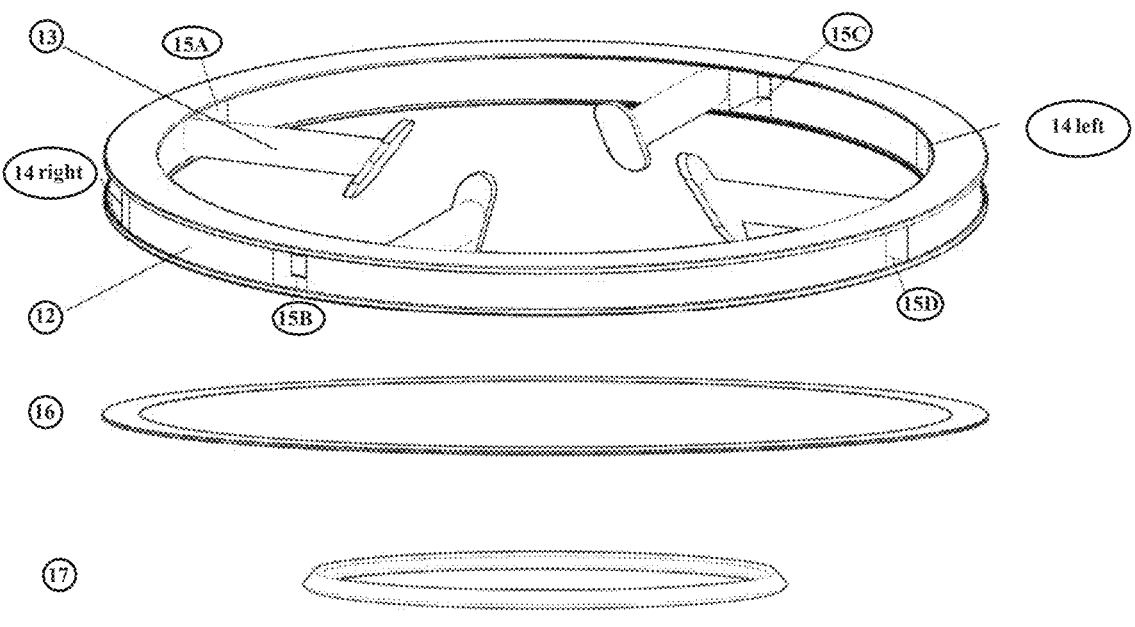
Figure 6:
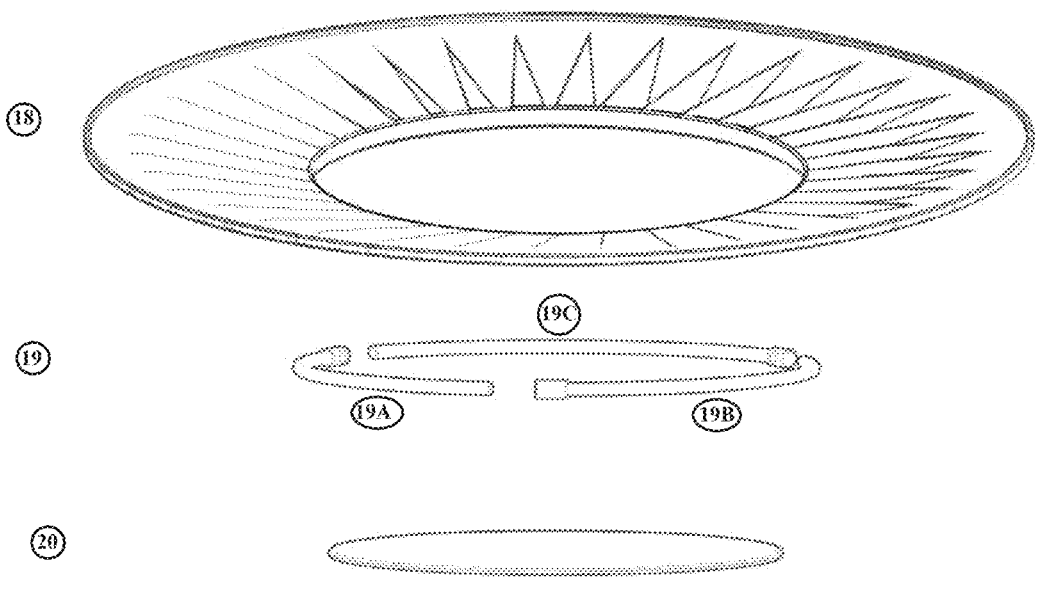

Atmospheric air is sucked into the space formed between the coaxial-seated spinning multi-blade turbines, the upper 2 and the lower 18, rotating counter-rotating and is discharged outside the machine. Tapered turbines 2,18 are mounted with wider bases facing each other, on bearings 4,16 on both sides fixed on the outer ring 12. The outer ring 12 is fixed on rigid horizontal beams 13 outside the central body 6, which has the shape of a truncated cone. To the central body 6 through linear motors that drive the support turbines are attached both turbines 2, 18 from the side of their smaller bases. The air accumulated under pressure in the air compression space thus created is ejected outside the outer ring 12 through the drive nozzles 15A, 15B, 15C, 15D built into it around the perimeter to obtain the desired thrust for horizontal flight or stabilization nozzles 14A, 14B to obtain rotational stabilization of the central body 6.

Forced by rotational movement and setting the blades of the carrier turbine upper 2, the injection of air masses into the space between turbines 2, 18, called the space between the disks, as a result of the expansion towards the base of the central body 6 and thus the narrowing space, leads to the compression of the air masses, and then forced by the rotational movement and setting of the blades of the lower turbine carrier turbine 18 acceleration and ejection of air masses under the machine results in a thrust vector for vertical movement of the machine. Ejection occurs along the entire circumference of the lower 18 carrier turbine at an angle perpendicular to the angle of inclination of the turbine blades, which gives additional stabilization of the machine.

Figure 7:
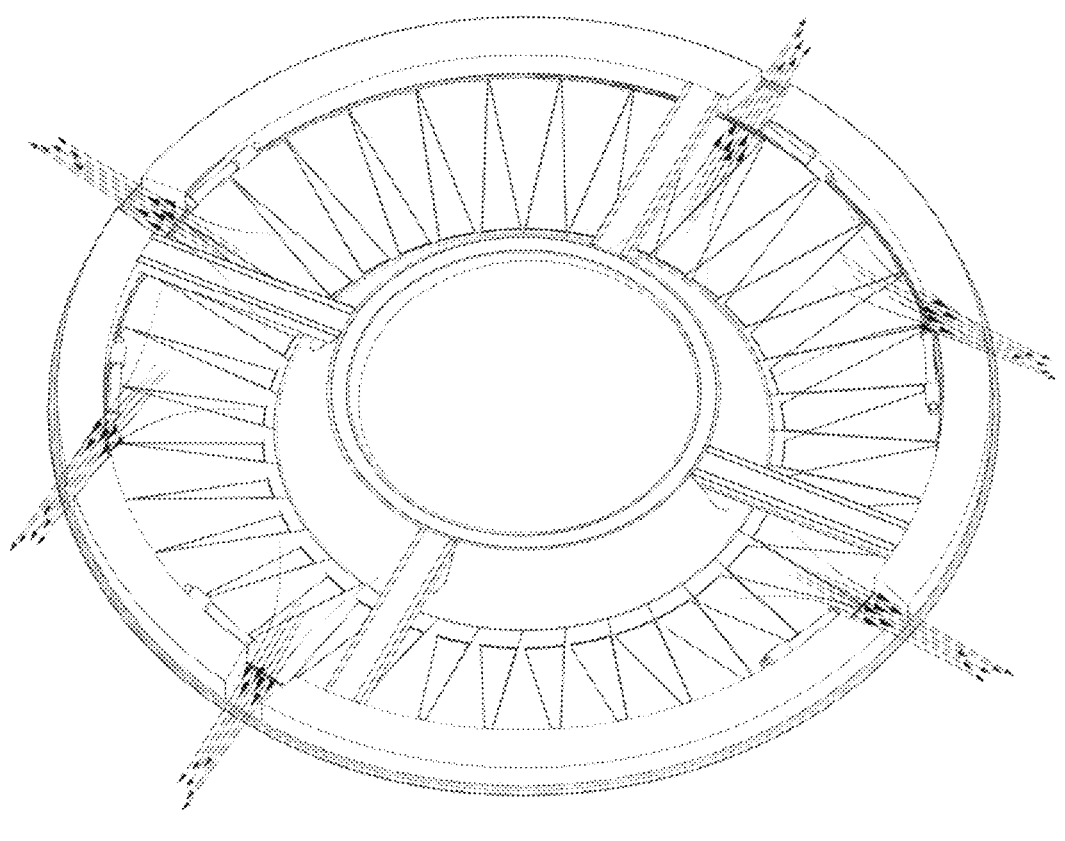
Figure 8:
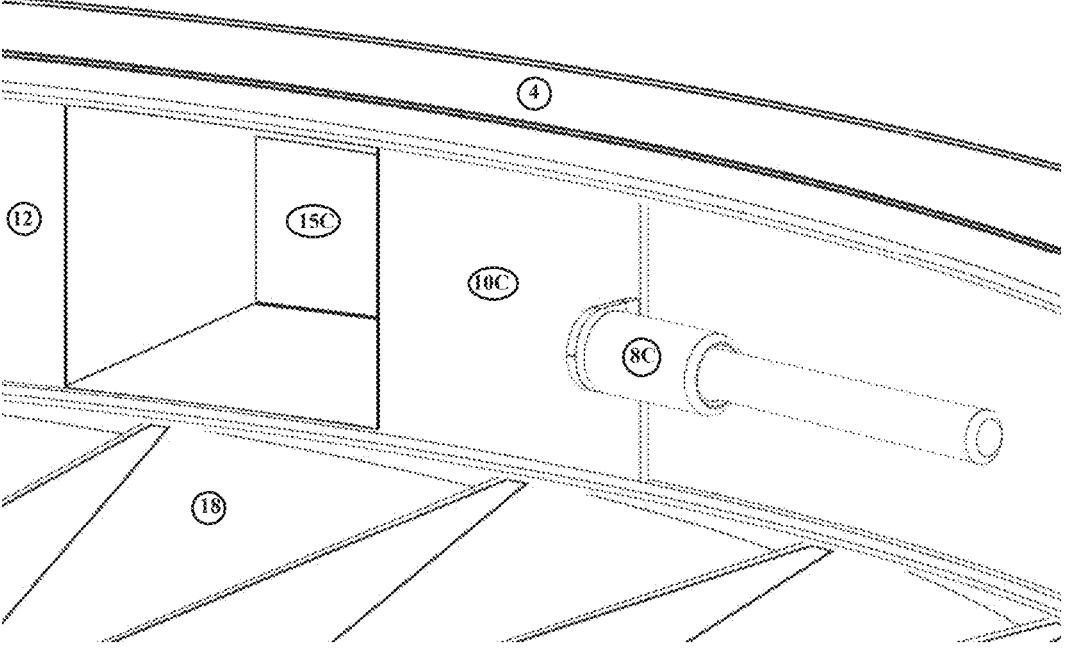
Figure 9:
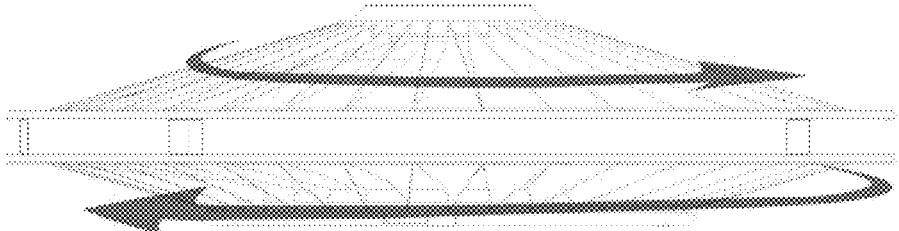
FIG. 9 shows the machine in side view with the opposite direction of rotation of the support turbines marked.

Opening and closing the drive nozzles 15A, 15B, 15C, 15D allows you to accelerate braking and change the direction of horizontal flight while maintaining a completely stationary position of the machine body in the horizontal axis. Acceleration of the horizontal flight speed is achieved by increasing the discharge of air masses with a nozzle or drive nozzles, obtained by accelerating the rotational speed of the upper turbine 2 while maintaining the rotational speed of the lower 18 carrier turbine at a constant level. In addition, the air injected in this way feeds the propulsion nozzles increasing the force of horizontal flight and maintaining constant revolutions of the lower 18 carrier turbine does not change the flight ceiling. Thanks to the stability of the machine obtained in this way, it is superfluous to install a rod or joysticks, since the entire flight in all its phases consists in asking the flight ceiling and achieving it thanks to the operation of the carrier turbines 2, 18 and determining the direction and speed of flight by opening or closing suitable drive nozzle. During the operation of load-bearing turbines with variable rotational speeds and the opposite direction of rotation (FIG. 9), a rotational inertia movement on the machine body is affected. In order to counteract this phenomenon, a minimum of two stabilization nozzles are placed in the outer ring 12 right and left 14A, 14B, which, after opening the flaps of one of them 11a, 11B, eject compressed air masses from the space between the disks directed obliquely in the horizontal axis (FIG. 7) giving a vector of rotational motion acting on the outer ring 12 together with the body of the machine acting oppositely and with the appropriate force to move the rotational inertia of the body to obtain the rotational immobility of the body of the flying machine. An additional possibility of achieving horizontal stability is optional possibility of using carrier turbine disks as stabilizing gyroscopes with appropriate mass distribution.

Example II

The central body 6 in the shape of a truncated cone has in the walls created around the perimeter battery space 7 and a separate space from the loading space intended for control, navigation and communication modules 5, closed from above, enabling communication of systems, drone 1. From the bottom, the central body 6 is closed with an opening loading ramp 20. To the central body 6 are permanently attached and powered actuators of linear electric motors 3, 17. The stators of these 3, 17 engines are permanently connected to the carrier turbines: the upper 2 and the lower 18. Linear motors 3, 17 have in cross-section the shape known from magnetic trains, giving drive and stability of connection of turbines 2, 18 with the central body 6. Outer ring 12 is permanently connected to the central body 6 by means of beams 13 rigid connection. Support turbines 2, 18 are connected to the outer ring 12 by means of magnetic bearings 4, 16 enabling rotary operation of both turbines 2, 18 on a magnetic cushion. A three-legged chassis 19 is attached to the central body 6. In the outer ring 12 there are two stabilizing nozzles 14A, 14B and four drive nozzles 15A, 15B, 15C, 15D, which are equipped with flaps 10A, 10B, 10C, 10D, whose movement is regulated by 8A, 8B, 8C and 8D stepper motors, which are the drive of opening and closing the total or partial nozzle to obtain a horizontal flight vector. The electronic modules of the communication, navigation and control systems are located in the upper part of the central body 6. Inside the central body 6 adjacent to its wall is located battery chamber 7. The interior of the central body 6 is the loading space. The machine has a three-legged chassis 19 and a loading ramp 20. Stabilizing nozzles 14A, 14B and drive nozzles 15A, 15B, 15C, 15D are equipped with flaps with a drive implemented by stepper motors.

The discharge occurs after opening the flaps 10A, 10B, 10C, 10D drive nozzles 15A, 15B, 15C, 15D and flaps 11A, 11B stabilizing nozzles 14A, 14B. The ejection of compressed air masses results in the formation of a horizontal flight sequence vector directed radially from the center of the central body 6 giving propulsion for horizontal flight in the direction opposite to the position of the nozzle. After opening the flaps 11A, 11B stabilizing nozzles 14A, 14B and the ejection of the compressed air masses through the nozzle in the horizontal oblique direction results in a thrust vector giving the central body of the 6th machine a rotational movement in the right direction (when viewed from above) aimed at stabilizing the rotational inertia of the central body of the 6th machine, which is the result of different rotational rotational speed of the support turbines 2, 18.

Figure 10:
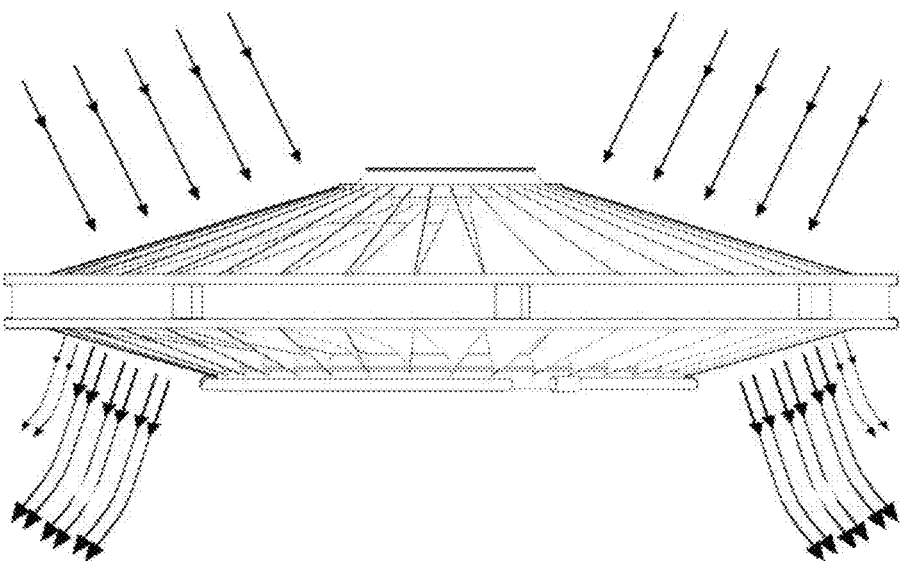
FIG. 10 shows the machine in a side view with the direction of air flow through the support turbines marked.
Figure 11:
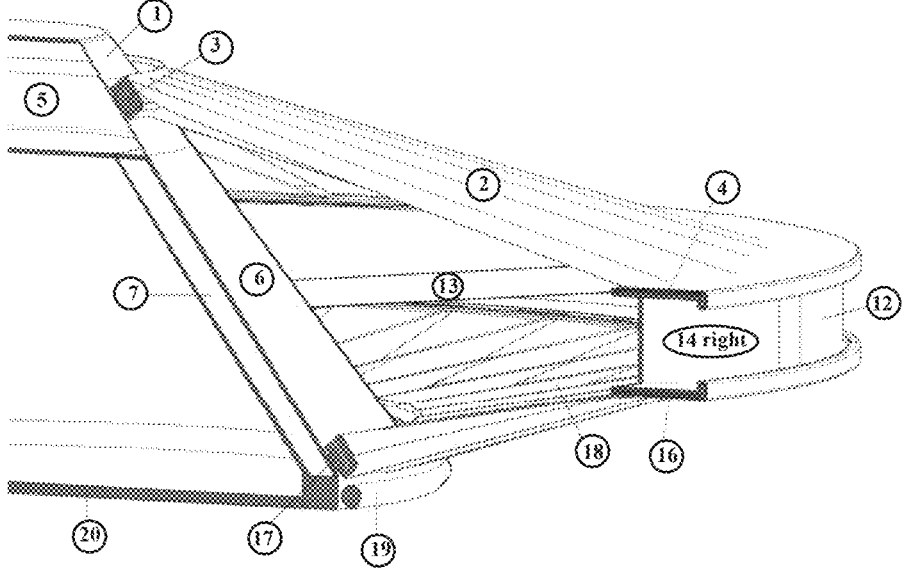
FIG. 11 shows the vertical cross-section of selected machine components and their mutual location.

The aerodynamic propulsion system of the machine allows flight while maintaining the complete horizontal stability of the machine in each phase of flight, without the need to perform any maneuvers with the body of the machine to change the direction of flight and altitude. This is possible thanks to the rotary operation of the support turbines of the machine: the upper 2 and the lower 18 support turbine, working counter-rotating (FIG. 9), compressing the air for ejection under the machine (FIG. 10) thanks to which we obtain the lift force for vertical flight and compressed in the space between the turbines, called the space between the disks, the air mass and ejected from there through the propulsion nozzles (FIG. 7) giving a thrust vector for horizontal flight. The inertia movement of the machine body occurring in this type of machines as a result of different rotational speed of the support turbines operating counter-rotating (FIG. 9) in individual phases of flight is solved by using 14A, 14B stabilization nozzles on the right and left, giving a thrust force for rotational motion in the direction opposite to the rotation of the inertia of the machine body. Stabilizing nozzles 14A, 14B are powered by compressed air masses from the space between the disks by opening flaps 11A, 11B, moved by stepper motors 9. For example, having four 15A, 15B, 15C, 15D propulsion nozzles arranged symmetrically around the perimeter, the machine can change the direction of flight by opening and closing them without the need for any movement or maneuver of the main body of the flying machine. It is possible to navigate the flying machine by assigning, for example, a 15A propulsion nozzle to the north magnetic pole and stabilizing the body of the machine in each phase of the flight so that the 15A propulsion nozzle is directed northwards, so that we can determine the direction of flight of the machine using the angular values of the azimuth—0-360 degrees from the GPS point A to the GPS B point and give a collision-free flight ceiling. In the cargo space of the central body 6 it is possible to place forwarding containers, for example, for cargo flights or courier shipments.

Batteries are fixed in the walls of the central body 6 around the perimeter, and with the help of a control system from the upper part of the central body 6, energy is supplied to the engines of the 2, 18 carrier turbines, with both turbines rotating counter-rotating and the upper 2 sucking atmospheric air into the space between the disks, and the lower turbine 18 throws air under the machine. The pressure increases, the area of the blades of the upper turbine 2 is larger than the area of the blades of the lower turbine 18, and the angles between turbines 2, 18 and external disk 12 are the same. The shape of the truncated cone gives us an overpressure, therefore, in addition to the air ejected downwards, the air is directed to the nozzles. One nozzle is open and the shape of the cone guarantees lifting force sufficient to fill the space between disks. After obtaining stability, the machine rises, and after obtaining the set height, we reduce the lifting force by reducing the speed of the turbines, especially the lower one, we open the drive nozzles to obtain thrust for horizontal flight, the stability of which is the result of the gyroscopic properties of the turbines.

LIST OF DESIGNATIONS

1—dome of communication and navigation systems optional observation

2—upper support turbine

3—linear electric motor drive of the upper support turbine

4—magnetic bearing of the upper support turbine

5—space of control, navigation and communication modules

6—central cone with loading space

7—battery space in the walls around the perimeter of the central cone

8A, 8B, 8C, 8D—stepper motors for drive flap drive of drive nozzles

9—stepper motors for the drive of the flaps of the stabilizing nozzles of the right and left

10A, 10B, 10C, 10D—drive nozzle flaps

11A, 11B—stabilizing nozzle flaps right and left

12—outer ring

13—beams of connection of the rigid outer ring with the body of the central cone

14A, 14B—right and left stabilizing nozzles

15A, 15B, 15C, 15D—drive nozzles

16—magnetic bearing of the lower support turbine

17—linear electric motor drive of the lower support turbine

18—lower support turbine

19—chassis of machine A B C with drive

20—loading ramp closing the loading space of the central cone

The invention claimed is:

1. A method of obtaining both, lifting force and thrust, required for horizontal flight of a vertical take-off and landing flying machine while maintaining horizontal flight stability of the vertical take-off and landing flying machine, comprising:

suctioning atmospheric air to an inner cavity formed between coaxial mounted, multi-blade turbines that are conically shaped ("conical turbines") (2, 18), the top and the bottom, wherein, the conical turbines are counter-rotating relative to each other, removing the atmospheric air to outside, under the machine;

wherein, each of the conical turbines has a circular base, the conical turbines are mounted with the circular bases facing the front of the central housing;

wherein an external ring has a contour edge and is mounted using distance spacers;

wherein double sided fixed magnetic bearings are mounted on the central housing;

wherein the conical turbines are mounted on the double-sided fixed magnetic bearings (4, 16) alongside the contour edge of the external ring (12), which is mounted using the distance spacers (13) form the inner side to the central housing (6) which is formed with the conical shape and which is the base where the conical turbines (2, 18) are mounted using linear drives from the side of their smaller bases; and removing air which is accumulated under the pressure at such inner cavity outside of the external ring (12) using drive nozzles (15A, 15B, 15C, 15D);

wherein the drive nozzles are installed circumferentially on an inner portion of external ring (12), to achieve thrust required for the horizontal flight and stabilization nozzles (14A, 14B) are configured to maintain required rotational stabilization of the central ring (6).

2. A vertical take-off and landing flying machine with an electric drive with communication, navigation and control systems comprising:

a conically shaped central housing ("central housing") with mounting space; the central housing having a top area, bottom area, rear area, and an interior cavity;

double sided fixed magnetic bearings ("magnetic bearings") mounted on the central housing;

rigid horizontal beams mounted on the central housing;

a top multi-blade turbine is coaxially mounted on the magnetic bearings and a bottom multi-blade turbine coaxially mounted on the magnetic bearings;

wherein the top multi-blade turbine and the bottom multi-blade turbine that are configured to be counter-rotating;

at least two linear drives; one linear drive circumferentially installed on the top area of the central housing that is configured to drive the top multi-blade turbine (2) and another linear drive circumferentially installed at the bottom area of the central housing, the linear drive installed at the bottom area of the central housing configured to drive the bottom multi-blade turbine (18) and the at least two linear drives (3, 17) each are mounted on the rigid, horizontal beams (13); and an external ring (12) is installed on the horizontal beams (13);

wherein the top multi-blade turbine (2) and the bottom multi-blade turbine (18) each have two circular bases, a wider circular base and a smaller diameter circular base, and the top turbine and bottom turbine are both conical main turbines and which are facing towards each other with the wider, circular bases and are both mounted on the magnetic bearings (4, 16) which are mounted circumferentially and double-sided towards the edge of the external ring (12); external ring (12) has oppositely installed at least two stabilization nozzles (14A, 14B) and between these nozzles at least four drive nozzles (15A, 15B, 15C, 15D) are mounted; the area of the top multi-blade turbine (2) blades is an area which is greater than the area of the bottom multi-blade turbine (18) blades.

3. The vertical take-off and landing flying machine according to claim 2, wherein the central housing has the communication, navigation and control systems which are installed at the top of the central housing (6), the communication, navigation, and control systems have electronic modules, the central housing (6) has an interior cavity; the communications, navigation and control systems are mounted in the interior cavity of the central housing (6), there is located a battery chamber (7) aligned with the central housing face and the inner cavity of the central housing is the cargo space.

4. The vertical take-off and landing flying machine according to claim 2, wherein the machine has a triple-leg landing chassis (19) and a loading ramp (20).

5. The vertical take-off and landing flying machine according to claim 2, wherein the stabilization nozzles (14A, 14B) and the driving nozzles (15A, 15B, 15C, 15D) are equipped with flaps driven by stepper motors.

6. The vertical take-off and landing flying machine according to claim 3 wherein the machine has a triple-leg landing chassis (19) and a loading ramp (20).

7. The vertical take-off and landing flying machine according to claim 3, further comprising stepper motors, wherein the stabilization nozzles and the driving nozzles that are equipped with flaps driven by the stepper motors.

8. The vertical take-off and landing flying machine according to claim 4, further comprising stepper motors, wherein the stabilization nozzles (14A, 14B) and driving nozzles (15A, 15B, 15C, 15D) are equipped with flaps driven by the stepper motors.

* * * * *